(12) United States Patent
Brown et al.

(10) Patent No.: US 8,659,826 B1
(45) Date of Patent: Feb. 25, 2014

(54) WORN DISPLAY SYSTEM AND METHOD WITHOUT REQUIRING REAL TIME TRACKING FOR BORESIGHT PRECISION

(75) Inventors: Robert D. Brown, Lake Oswego, OR (US); Steven J. Robbins, West Linn, OR (US); Francois Raynal, San Jose, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 880 days.

(21) Appl. No.: 12/700,557

(22) Filed: Feb. 4, 2010

(51) Int. Cl.
*G02B 23/08* (2006.01)
*G02B 27/14* (2006.01)

(52) U.S. Cl.
USPC .......................... 359/402; 359/403; 359/630

(58) Field of Classification Search
USPC .......... 359/402, 403, 566, 567, 630, 634, 636
See application file for complete search history.

(56) References Cited

U.S. PATENT DOCUMENTS

| | | | |
|---|---|---|---|
| 4,647,967 A | 3/1987 | Kirschner et al. |
| 4,711,512 A | 12/1987 | Upatnieks |
| 4,714,320 A | 12/1987 | Banbury |
| 5,079,416 A | 1/1992 | Filipovich |
| 5,218,360 A | 6/1993 | Goetz et al. |
| 5,369,511 A | 11/1994 | Amos |
| 5,524,272 A | 6/1996 | Podowski et al. |
| 5,668,907 A | 9/1997 | Veligdan |
| 5,727,098 A | 3/1998 | Jacobson |
| 5,856,842 A | 1/1999 | Tedesco |
| 5,892,598 A | 4/1999 | Asakawa et al. |
| 6,176,837 B1 | 1/2001 | Foxlin |
| 6,333,819 B1 | 12/2001 | Svedenkrans |
| 6,409,687 B1 | 6/2002 | Foxlin |
| 6,550,949 B1 | 4/2003 | Bauer et al. |
| 6,847,488 B2 | 1/2005 | Travis |
| 7,021,777 B2 | 4/2006 | Amitai |
| 7,101,048 B2 | 9/2006 | Travis |
| 7,199,934 B2 | 4/2007 | Yamasaki |
| 7,259,906 B1 | 8/2007 | Islam |
| 7,395,181 B2 | 7/2008 | Foxlin |
| 7,411,637 B2 | 8/2008 | Weiss |
| 7,433,116 B1 | 10/2008 | Islam |
| 7,436,568 B1 | 10/2008 | Kuykendall, Jr. |
| 7,593,575 B2 | 9/2009 | Houle et al. |
| 8,004,765 B2 * | 8/2011 | Amitai .......................... 359/618 |

(Continued)

FOREIGN PATENT DOCUMENTS

WO    WO 99/52002    10/1999

OTHER PUBLICATIONS

Äyräs, P., et al., "Exit pupil expander with a large filed of view based on diffractive optics," Journal of the SID, vol. 17/8, 2009, pp. 659-664.

*Primary Examiner* — Frank Font
(74) *Attorney, Agent, or Firm* — Donna P. Suchy; Daniel M. Barbieri

(57) ABSTRACT

A worn display, such as a head worn display, includes a projector and a periscopic system configured to be wearable. The periscopic system includes at least one diffraction grating member. The member includes an input end for receiving an image from a projector and a combiner end for receiving light from a scene and providing the image received at the input end and the light received from the outside scene to the user. The head worn display can be used in aircraft applications to provide guidance information to a pilot.

20 Claims, 5 Drawing Sheets

(56) References Cited

U.S. PATENT DOCUMENTS

| | | | |
|---|---|---|---|
| RE42,992 E * | 12/2011 | David | 345/7 |
| 8,189,263 B1 * | 5/2012 | Wang et al. | 359/633 |
| 8,233,204 B1 * | 7/2012 | Robbins et al. | 359/15 |
| 8,398,242 B2 * | 3/2013 | Yamamoto et al. | 353/28 |
| 8,403,490 B2 * | 3/2013 | Sugiyama et al. | 353/28 |
| 2003/0063042 A1 * | 4/2003 | Friesem et al. | 345/6 |
| 2006/0132914 A1 * | 6/2006 | Weiss et al. | 359/462 |
| 2006/0279662 A1 * | 12/2006 | Kapellner et al. | 348/744 |
| 2008/0043334 A1 * | 2/2008 | Itzkovitch et al. | 359/569 |
| 2008/0151379 A1 * | 6/2008 | Amitai | 359/630 |
| 2008/0278812 A1 * | 11/2008 | Amitai | 359/487 |
| 2009/0097122 A1 * | 4/2009 | Niv | 359/575 |
| 2009/0128902 A1 * | 5/2009 | Niv et al. | 359/482 |
| 2009/0190222 A1 * | 7/2009 | Simmonds et al. | 359/567 |
| 2010/0060551 A1 * | 3/2010 | Sugiyama et al. | 345/8 |
| 2010/0177388 A1 * | 7/2010 | Cohen et al. | 359/566 |
| 2011/0026128 A1 * | 2/2011 | Baker et al. | 359/630 |
| 2012/0120493 A1 * | 5/2012 | Simmonds et al. | 359/566 |
| 2012/0235900 A1 * | 9/2012 | Border et al. | 345/156 |
| 2012/0280956 A1 * | 11/2012 | Yamamoto et al. | 345/204 |

* cited by examiner

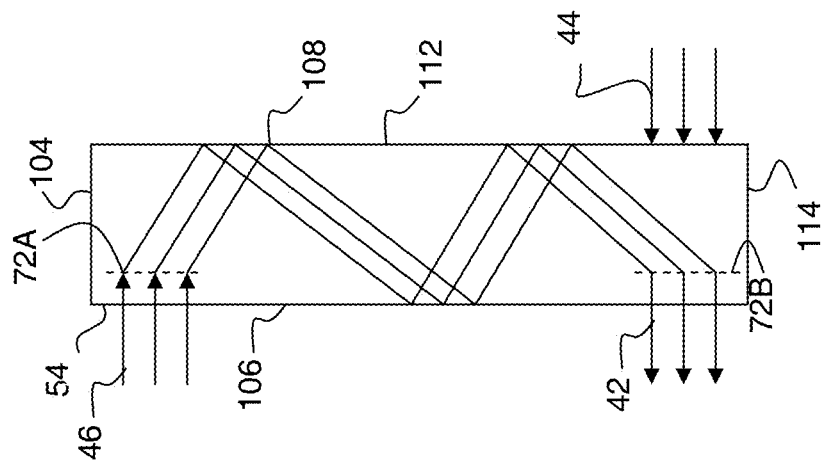
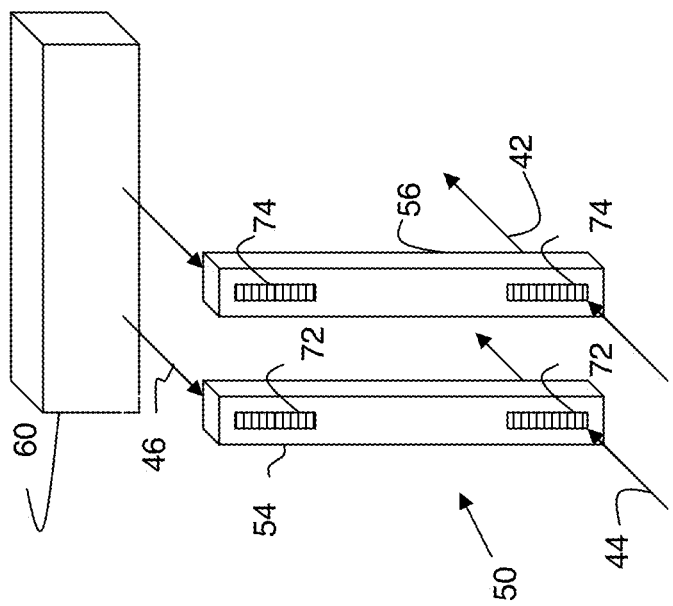

WORN DISPLAY SYSTEM AND METHOD WITHOUT REQUIRING REAL TIME TRACKING FOR BORESIGHT PRECISION

BACKGROUND OF THE INVENTION

The present specification relates to displays. More particularly, the present specification relates to a worn display, such as a head worn display (HWD) also known as a head-mounted display.

Display systems have been used to provide information to users for various applications. In aircraft applications, displays can provide precision guidance information to a pilot. For example, head-up displays (HUDs) superimpose images from two sources, the outside world and a second source for presentation to the pilot. Head-up displays are especially useful in aircraft because they allow the pilot to view information related to flight parameters without diverting attention from the view of the outside world through the windshield. Conventional head-up displays require optical components that can be heavy, expensive, and take up space in the cockpit.

Worn displays such as head worn displays have similarly been used in aircraft applications to allow a pilot to view precision guidance information without diverting attention from the real world scene. One type of head worn display is a helmet mounted display in which optical components are mounted to the operator's helmet. Helmet mounted displays are primarily used in military applications.

Worn displays often must maintain boresight accuracy when displaying precision guidance information. To achieve boresight accuracy, the worn display requires a tracking sensor that determines the position of the worn components of the worn display with respect to the boresight so that the differences in positions can be accommodated. For example, head worn displays including helmet-mounted displays used in the cockpit of an aircraft often require head tracking to determine the orientation of head worn portion of the display so that the displayed material can be offset to produce conformal alignment with the real world scene.

Head tracking is typically performed by magnetic, inertial and/or optical sensors that determine the position of the component worn by the pilot in six degrees of movement. Head tracking equipment increases the size and cost of head worn displays. In addition, head tracking requires connectivity between the magnetic, inertial and/or optical sensors and the non-worn portion of the display system.

Thus, there is a need for a lower cost, lighter, and smaller worn display. Further, there is a need for a worn display which does not require a helmet. Further still, there is a need for a worn display that does not require connectivity (mechanical and/or electrical) between the component worn by the user and the rest of the display system. Yet further still, there is a need for a worn display where the component that is worn is entirely passive and insensitive to all six degrees of movement, (e.g., six degrees of freedom invariant). Further still, there is a need for a worn display optimized for use in the constrained cockpit area of small aircraft. Even further still, there is a need for a worn display that utilizes periscopic principles to achieve six-degree-of-freedom insensitivity. Yet further, there is a need for a head worn display that does not require headtracking and yet provides precision guidance information conformally aligned with the real world scene.

Accordingly, it would be desirable to provide a display system and/or method that provides one or more of these or other advantageous features. Other features or advantages will be made apparent in the present specification. The teachings disclosed extend to those embodiments which fall within the scope of the appended claims, regardless of whether they accomplish one or more of the aforementioned advantages or features.

SUMMARY OF THE INVENTION

An exemplary embodiment relates to a worn display, such as a head worn display. The worn display includes a projector and a periscopic system. The periscopic system is configured to be wearable. The periscope system includes at least one diffraction grating member. The diffraction grating member has an input end for receiving an image from the projector and a combiner end for receiving light from a scene. The diffraction grating member provides the image received at the input end and the light received from the outside scene to the user at the combiner end.

An exemplary embodiment relates to a head-mounted device for use with a display. The display provides a collimated or near collimated image. The head mounted device includes a first diffraction grating member and a second diffraction grating member. The first diffraction grating member and the second diffraction grating member are configured so that a first end of each of the diffraction grating members can be provided in front of a respective eye of a user and a second end of each of the first and second diffraction grating members receives the collimated or near collimated image. The first end receives light from a real world scene.

Yet another exemplary embodiment relates to a method of providing guidance information to a pilot of an aircraft. The method includes providing collimated or near collimated light indicative of the guidance information from a display to a passive element configured to be worn by the pilot. The passive element is electrically unconnected to the display. The method also includes combining light from a real world scene with the collimated or near collimated light using the element. The element includes a diffraction grating.

BRIEF DESCRIPTION OF THE DRAWINGS

Exemplary embodiments are hereinafter described with reference to the accompanying drawings, wherein like numerals refer to like elements, and:

FIG. 3 is a perspective view schematic drawing of the system illustrated in FIG. 2 in accordance with a further exemplary embodiment;

FIG. 9 is a more detailed block diagram of one of the waveguides illustrated in FIG. 2, in accordance with another exemplary embodiment.

DETAILED DESCRIPTION OF THE PREFERRED EMBODIMENTS

Figure 1:
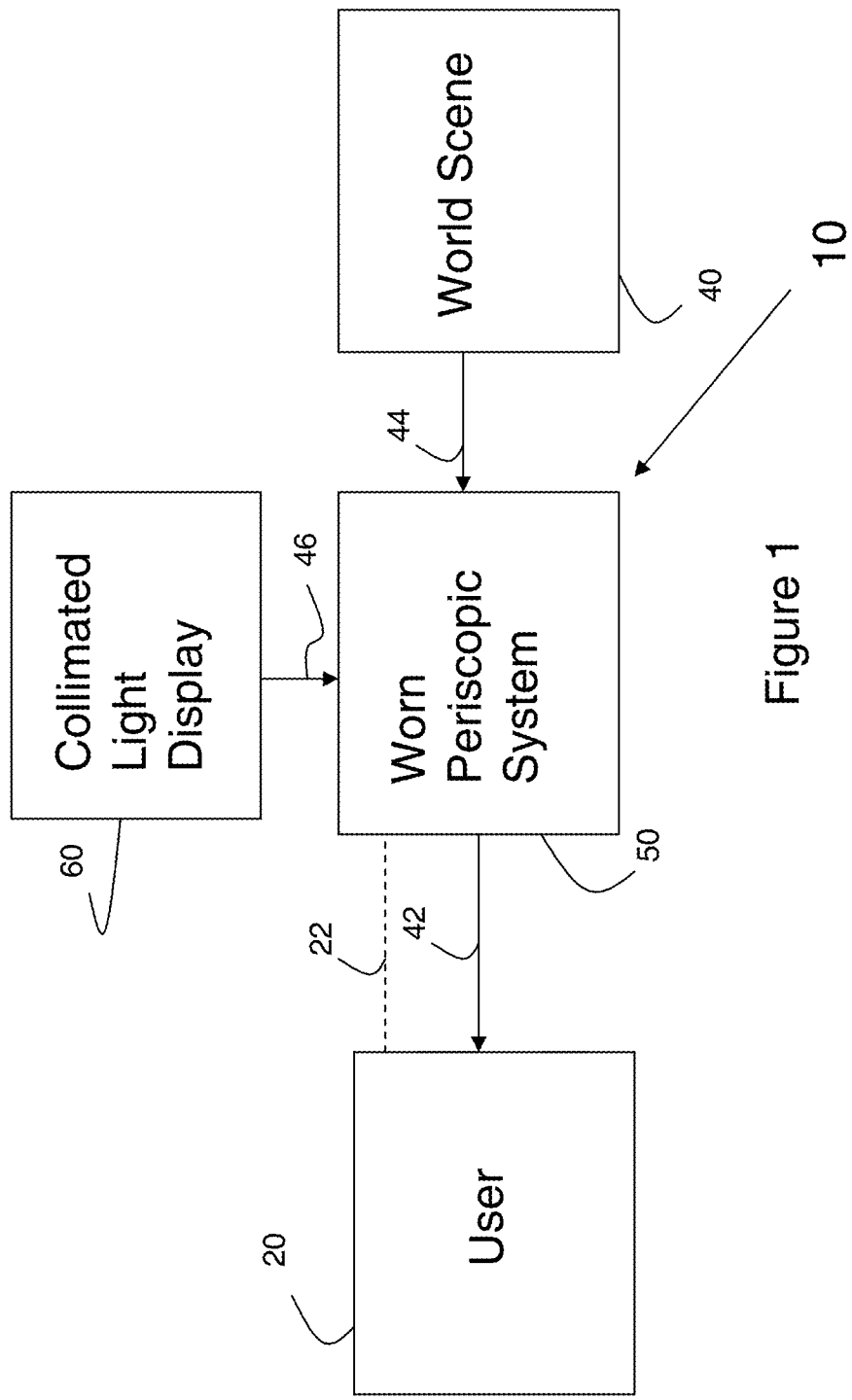
FIG. 1 is a general block diagram of a display system including at least one worn component in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control, and arrangement of components have been illustrated in the drawings by readily understandable block representations and schematic drawings, in order not to obscure the disclosure with structural details which will be readily apparent to those skilled in the art, having the benefit of the description herein. The Figures are not drawn to scale. Further, the invention is not limited to the particular embodiments depicted in the exemplary diagrams, but should be construed in accordance with the language in the claims.

With reference to FIG. 1, a wearable display system 10 is preferably configured as a head worn display (HWD). System 10 is described below for use in a cockpit of aircraft. However, system 10 can be utilized in a variety of applications, including driving applications, military applications, medical applications, targeting applications, etc. without departing from the scope of the invention.

System 10 preferably includes a periscopic system 50 and a collimated light display 60. Periscopic system 20 is preferably a wearable component of system 10 and can be attached to or worn by user 20 as represented by dashed line 22 in FIG. 1. Although preferably wearable on the head of user 20, system 50 can be coupled to user 20 in other fashions or onto other body parts.

Collimated light display 60 provides collimated light or a near collimated light 46 to periscopic system 50. Periscopic system 50 combines the near collimated or collimated light 46 with light 44 from a real world scene (preferably light is received through a windshield). The combined light is provided as light 42 to user 20.

Advantageously, according to one embodiment, system 10 does not require head tracking equipment and electrical connectivity is not required between periscopic system 50 worn by user 20 and collimated light display 60 or other parts of the aircraft. In a preferred embodiment, periscopic system 50 is preferably entirely passive and insensitive to movements in all six degrees of freedom. Advantageously, periscopic system 50 is configured so that rays of light 42 exiting periscopic system 60 to user 20 are parallel and in a reverse direction to rays of light 46 entering periscopic system 50 from display 60 according to a periscopic effect. Alternatively, system 50 can be arranged such that rays of light 42 exiting system 50 travel in a same direction and are parallel to rays of light 46.

Various optical components can be utilized to cause to the periscopic effect. For example, the periscope effect can be implemented by wave guides, mirrors, prisms, or other optical components. System 50 can also include additional optic components without departing from the invention.

Light 46 from collimated light display 60 preferably provides information to user 20. The information can be any type of information useful to user 20. In an aircraft application and according to one exemplary embodiment, the information can be flight parameters, such as, precision guidance information, navigation information, aircraft instrumentation information, or other flight information or warnings used when flying an aircraft. Alternatively, other types of information can be provided by collimated light display system 60 depending upon system criteria and application parameters. For example, system 60 can be used to provide targeting information in military applications or guidance information in surgical applications. Advantageously, the combination of collimated light display system 60 and periscopic system 50 provides a virtual image at optical infinity or near optical infinity of the information associated with light 46 for user 20 similar to an image produced by a conventional head-up display (HUD).

According to a preferred embodiment, periscopic system 50 is a waveguide that operates both as a guide for collimated light 46 from display 60 and a combiner for combining light 46 with light 44 for viewing by user 20. In one embodiment, periscopic system 50 utilizes a waveguide with diffraction gratings to achieve the periscopic effect. The waveguide is preferably lighter than more conventional optics such as mirrors, prisms, lenses, etc. Alternatively, other optical light weight components suitable for wearing by user 20 can be used (e.g., lenses, filters, coatings, etc.).

Unlike conventional HUDs, light 46 from display 60 is preferably transmitted through a waveguide rather than entirely through free space. The use of a waveguide and diffraction gratings allows periscopic system 50 to operate as an extremely compact and lightweight periscope. Such compactness is advantageous in aircraft, especially aircraft with smaller cockpits.

System 10 preferably has a 10-25 millimeter exit pupil. The use of the diffraction gratings advantageously enables pupil expansion in which a small collimated beam (e.g., light 46) is expanded in diameter to allow more range of eye motion while seeing the entire image from display system 60. Advantageously, the nature of periscopic system 50 allows it to be handheld and allows the display of the information to be extremely stable while the diffraction grating is rotated over large ranges. The boresight angle remains parallel as collimated light source 60 is fixed with respect to the boresight angle.

Figure 2:
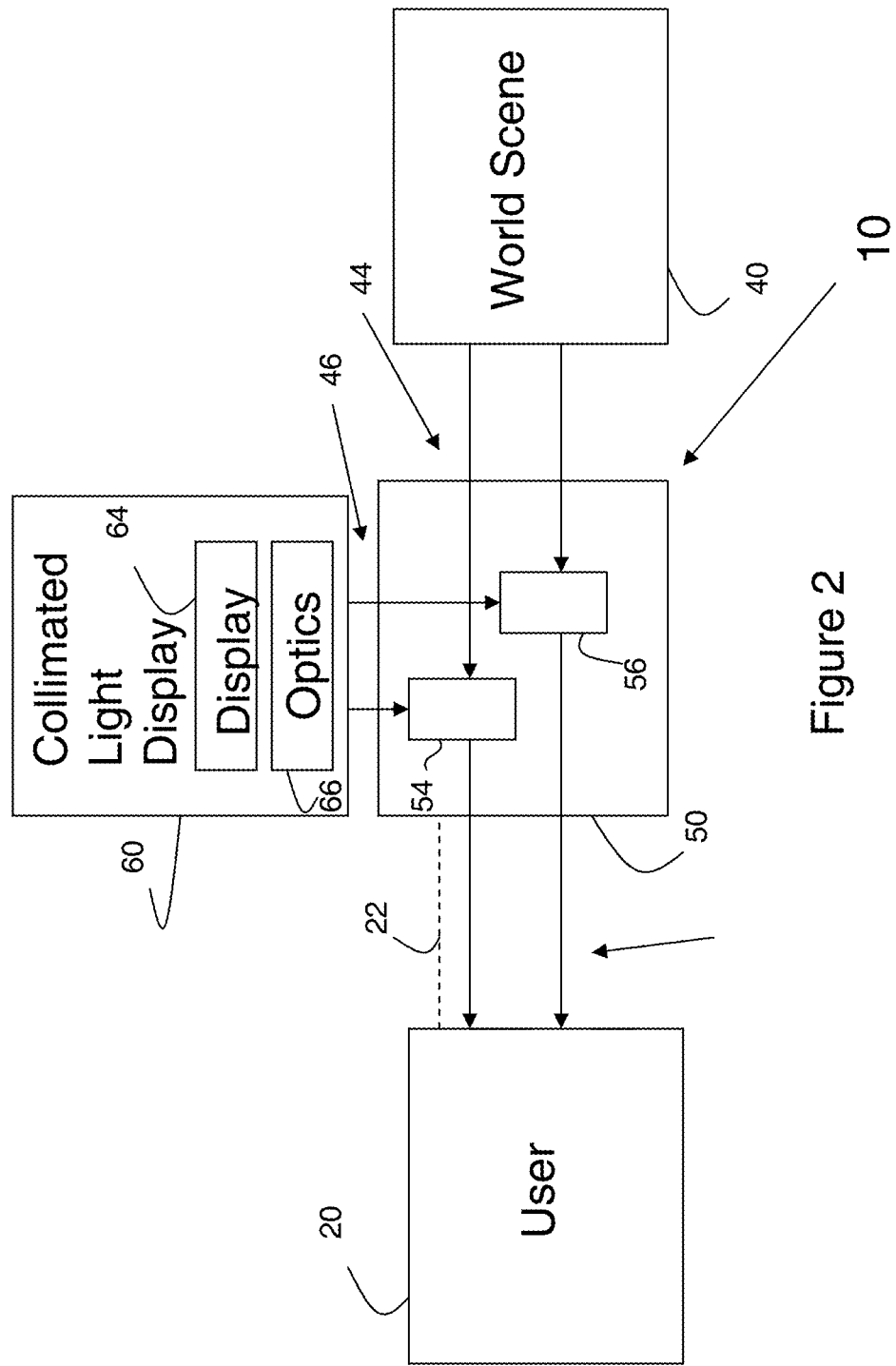
FIG. 2 is a more detailed block diagram of a display system similar to the system illustrated in FIG. 1 and including two waveguides in accordance with another exemplary embodiment.
Figure 4:
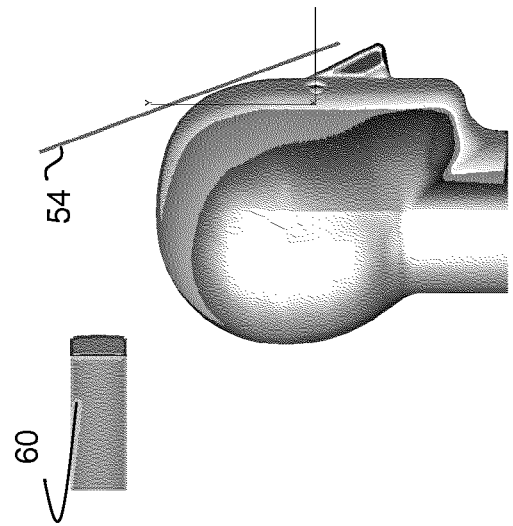
FIG. 4 is another perspective view schematic drawing showing the system illustrated in FIG. 2 with a user in accordance with yet another exemplary embodiment.
Figure 5:
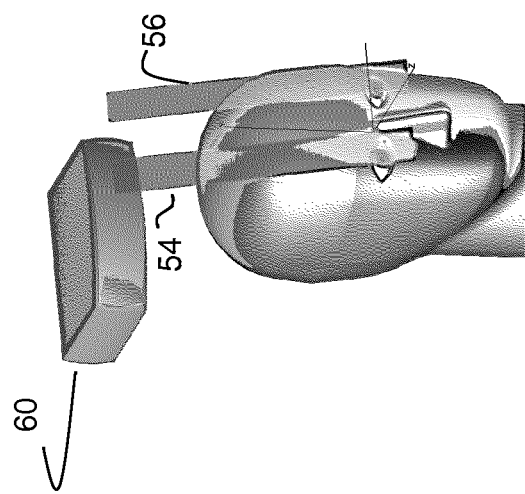
FIG. 5 is a side planar view schematic drawing of the system illustrated in FIG. 4.

With reference to FIG. 2, collimated light display system 60 preferably includes a display 64 and optics 66. Optics 66 can include projection optics, mirrors, prisms, collimating optics, lenses (e.g., a field flattener lens), etc. Alternatively, display 64 can provide collimated light without requiring additional optics such as optics 66. Display system 60 is preferably aligned with the boresight of the aircraft during installation. Preferably, collimated light display system 60 is provided as an overhead mounted collimator. Alternatively, display system 60 can be a binocular collimator (e.g., one for each eye).

Display 64 can be a display of any type including a microdisplay, an active matrix LCD display, a CRT, an OLED display, a fixed display, or any type of device for providing collimated light to periscopic system 50. System 60 can be a projector used in conventional HUD.

Advantageously, periscopic system 50 can eliminate the requirement for expensive combiner stow and breakaway mechanisms. Further, system 50 can eliminate the need for combiner alignment detection and associated integrity monitoring. In one embodiment, system 50 is used with electronics and projectors associated with conventional head worn displays (e.g., HMDs), and/or conventional HUDs.

Contrary to the operation of conventional HMDs, system 10 has a fixed field of view. If user 20 rotates his or her head farther than the field of view collimated light display 60, the display image is entirely lost. Preferably, user 20 is located at the design eye associated with system 10. The eyebox of system 10 can have reasonably similar tolerances to conventional HUD technologies.

Periscopic system 50 preferably includes at least one diffraction grating member. In a preferred embodiment, system 50 includes a pair of waveguides 54 and 56, each including a set of diffraction gratings for diffracting light in accordance with a periscopic effect. Preferably, waveguides 54 and 56 operate as a pair of waveguides, one for each eye that couples light 46 from display 60 into the eyes of user 20 and also provides adequate field of view and adequate eyebox for viewing comfort. The light weight associated with waveguides 54 and 56 allow them to be easily worn by user 20. For example, wearing waveguides 54 and 56 can be as comfortable as wearing sunglasses.

Figure 7:
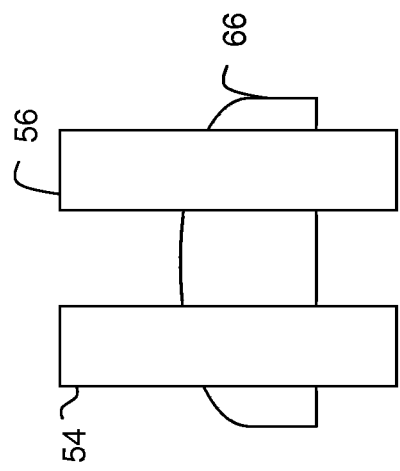
FIG. 7 is a front planar view schematic drawing of the periscopic system illustrated in FIG. 2 attached to a hat in accordance with still another exemplary embodiment.
Figure 6:
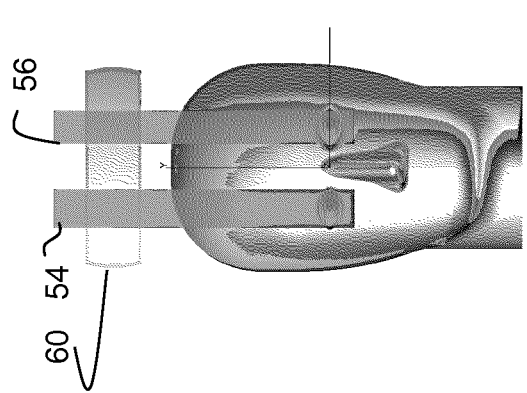
FIG. 6 is a front planar view schematic drawing of the system illustrated in FIG. 4.
Figure 8:
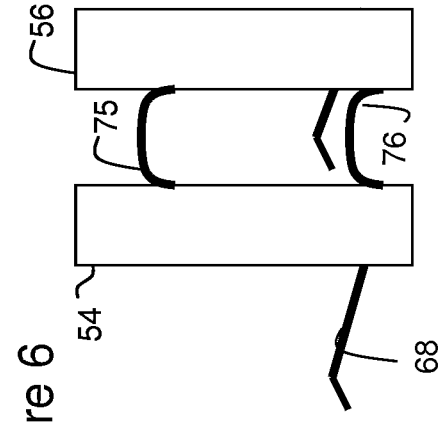
FIG. 8 is a front planar view schematic drawing of the periscopic system illustrated in FIG. 2 configured to be worn by a user as glasses in accordance with another exemplary embodiment.

With reference to FIG. 7, the waveguides 54 and 56 can be attached to a cap, helmet or hat 66. With reference to FIG. 8, waveguides 54 and 56 can be worn as glasses. Temple arms 60 can be utilized to situate waveguides in front of a user's eyes. Frame members 75 and 76 can provide stability. Member 76 can rest on a user's nose.

The alignment of waveguides 54 and 56 to each other is not critical because waveguides 54 and 56 are preferably optically rotationally invariant. In a preferred embodiment, optical invariance to rotation can be achieved using the periscopic principles associated with periscopic system 50. System 50 is preferably configured so that rays entering system 50 exit system 50 along new paths exactly parallel to original paths, regardless of orientation of system 50. System 50 is configured for this characteristic for all six degrees of freedom of orientation of system 50 in accordance with operational principles of a periscopic device. In addition, alignment with hat 66 or frame members 76 is not critical. Waveguides 54 and 56 can be provided as a unitary piece or be mechanically connected to each other in a variety of fashions. Preferably, waveguides 54 and 56 are oriented at 20 to 40 degrees to the pilot's line of sight along the boresight.

Although shown as two distinct waveguides 54 and 56, waveguides 54 and 56 can be combined as a single waveguide. Preferably, waveguides 54 and 56 are manufactured with relatively low cost material, such as, plastic, glass, etc. Waveguides 54 and 56 preferably do not include expensive coatings and could even be considered disposable items or items to be issued to aircraft pilots rather than as aircraft equipment.

In an alternative embodiment, system 10 can be a helmet mounted display such as for military helmets where head tracking is already accepted. In such an embodiment, there are no alignment restrictions other than boresighting of the head tracker because the alignment of waveguides 54 and 56 is insensitive. In this embodiment, the need for precision interfaces for helmet visors can be eliminated, thereby substantially reducing costs of the helmet assembly.

With reference to FIG. 3 and according to a preferred embodiment, waveguides 54 and 56 include sets of diffraction gratings 72 and 74, respectively. Preferably, gratings 72 and 74 have a spatial frequency of 2000 to 4000 lines per millimeter. Diffraction gratings 72 and 74 can be many manufactured according to a variety of techniques. As shown in FIGS. 3-6, projector 60 can be provided above and behind the head of the user in certain embodiments.

Gratings 72 and 74 can be formed by etching, cutting, printing, wet chemical, dry chemical, ion etching, laser etching, electron bean etching, staining, holographic exposure, etc. Waveguides 54 and 56 are preferably manufactured from any suitable material including, but not limited to transparent or translucent materials, such as, dielectric materials with high permittivity and high index of refraction (e.g., glass or plastic). Waveguides 54 and 56 can also be a laminate material and can be shaded or coated for filtering light.

Waveguides 54 and 56 preferably have a rectangular prismatic shape having a length larger than its width and a thickness smaller than its width. The dimensions of waveguides can be 10×2×0.125 inches. In a preferred embodiment, waveguides 54 and 56 are flat and flexible.

Diffraction gratings 72 and 74 can be providing only on a first-end (input end) and a second end (output or combiner end) of waveguides 54 and 56 for effecting the periscopic effect. The intermediate portion between the first end and second end is preferably free of diffraction gratings and operates as a waveguide between the input and output.

System criteria and application parameters may affect the size and type of spacing for gratings 72 and 74. Preferably, the area associated with the input of light 46 is larger than the area associated with the output of light 42. The difference in area results in an effective compression rather than expansion of beams incident on waveguide 54. The areas can be at any ratios depending upon design criteria and system applications. For example, the use of a smaller display and design criteria of a larger pupil would result in a larger area ratio. In one embodiment, such a compression can be limited by the need to have an exit pupil large enough to allow a degree of freedom of movement of the pilot's head without loss of display.

With reference to FIG. 9, waveguide 54 is similar to waveguide 56 and includes a diffraction grating 72a and diffraction grating 72b. Light 46 from display system 60 enters waveguide 54 at a first side 106 at end 114 with combined light 42 on a first end 104 and is diffracted by grating 72 downward towards a second end 114 and towards a side 108.

Light 46 is reflected by total internal reflection from side 108 to side 106 and from side 106 to side 108 as it travels across intermediate portion 112. Light 46 travels through waveguide 54 until it eventually strikes diffraction grating 72b where it is diffracted toward side 106 and exits substrate 54 on side 106. Combined light 42 includes light 46 and light 44 from side 108.

Grating 72a is preferably more efficient than grating 72b. In one embodiment, gratings 72B is approximately 10 percent efficient so that a large portion of light 46 can travel through grating 72b to side 106. The portion of light 46 diffracted by grating 72b travels through the waveguide and is eventually lost to absorption. Grating 72a preferably has an efficiency of more than 90 percent (most preferably as efficient as possible so light 46 from display system 60 does not unnecessarily escape waveguide 54).

The specific configuration of FIG. 9 is shown by way of example only. The angle of incidence, number of reflections, etc., are shown for purposes of discussion only. For example, a multitude of reflections occur as light travels across portion 112 from end 104 toward end 114, according to one embodiment. The present invention is not limited to the detail shown in Figure Various geometries and placement of the display system 60 are possible and can be configured for specific cockpit geometries. System 60 can utilize a reflective device utilized by conventional substrate guided HUD systems. Expense can be saved using molded optics and more simplistic coatings in system 10.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of materials, dimensions, and processes are mentioned, other materials, dimensions, and process steps can be utilized. Various changes may be made to the details disclosed without departing from the spirit of the invention which is defined by the following claims.

What is claimed is:

1. A worn display for a user having a head and eyes, the worn display, comprising:
   a projector; and
   a periscopic system configured to be wearable and physically separate from the projector and physically free from the projector across rotational movement of the periscopic system when worn on the head, the periscopic system including at least one diffraction grating member, the diffraction grating member having an input end for receiving a collimated image from the projector, and a combiner end for receiving light from an outside scene and providing the collimated image received at the input end and the light received from the outside scene to the user, wherein the worn display is configured to receive the collimated image at the input end from the projector disposed at a location above and behind the head when the periscopic system is worn on the head, the at least one diffraction grating member extending vertically from the input end to the combiner end, wherein the input end is configured to be disposed above the head to receive the image from the projector and the combiner end is configured to be disposed in front of the eyes when the periscopic system is worn by the user.

2. The display of claim 1, wherein the periscopic system comprises two separate diffraction grating members, each diffraction grating member being disposed in front of a respective one of the eyes at the combiner end; wherein the diffraction grating members are elongated rectangles extending longitudinally from the input end to the combiner end.

3. The display of claim 2, wherein each diffraction grating member comprises at least one diffraction grating having a spatial frequency of 2000-4000 gratings per millimeter.

4. The display of claim 3, wherein the diffraction grating is etched or printed.

5. The display of claim 4, wherein the diffraction grating members are each a unitary piece of plastic material.

6. The display of claim 5, wherein the diffraction grating members are bendable.

7. The display of claim 6, wherein the diffraction grating members have a thin rectangular prismatic shape.

8. The display of claim 7, wherein the projector is a micro display.

9. The display of claim 2, wherein an intermediate section of the diffraction grating members is disposed between the combiner end and the input end and does not include a grating.

10. A head mounted device for use with a display projector providing a collimated or near collimated image to eyes of a user, the user having a head, the head mounted device comprises:
   a first diffraction grating member; and
   a second diffraction grating member, wherein the first diffraction grating member and the second diffraction grating member are configured so that a first end of each of the first and second diffraction grating members can be provided in front of a respective eye of a user and a second end of each of the first and second diffraction grating members receives the collimated or near collimated image, wherein the first end receives light from a real world scene, wherein the second end is disposed above a top of the head of the user when the first diffraction grating member and the second diffraction grating member are worn by the user, wherein the first diffraction grating member and the second diffraction grating member are physically separate from the display projector and physically free from the display projector across rotational movement of the first diffraction grating member and the second diffraction grating member when worn on the head of the user.

11. The head mounted device of claim 10, wherein the first and second diffraction grating members provide a periscopic effect.

12. The head mounted device of claim 11, wherein the diffraction grating members include markings at a spatial frequency between 2000 and 4000 gratings per millimeter.

13. The head mounted device of claim 12, wherein each of the first and second members is a unitary piece comprised of flexible plastic material.

14. The head mounted device of claim 10, wherein the first and second diffraction grating members each have a first flat planar side and a second flat planar side, where the first side is opposite the second side and is closer to the respective eye than the second side and the collimated or near collimated image is received from the display projector on the first side, and the light from the real world scene is received on the second side.

15. The head mounted device of claim 10, wherein the first diffraction grating member and the second diffraction grating member are flat and flexible.

16. The head mounted device of claim 15, wherein the display projector for providing the collimator or near collimated image is provided behind a user.

17. A pair of optical elements configured for use with a projector disposed above and behind a head of a pilot, the pair of optical elements being worn by the pilot and each of the pair of optical elements comprising:
   a first diffraction grating configured to receive a collimated image or near collimated image from the projector when worn by the pilot, wherein the first diffraction grating is disposed above a head of the pilot when worn by the pilot; and
   a second diffraction grating disposed in front of a respective eye of the pilot when worn by the pilot, wherein the second diffraction grating provides an image from the projector to the pilot and allows conformal viewing of the image with a real world scene, wherein the pair of optical elements is physically separate from the projector and is physically free across rotational movement of the pair of optical elements from the projector when worn on the head of the user.

18. The pair of optical elements of claim 17 wherein the optical elements are thin flexible material.

19. The pair of optical elements of claim 18 wherein each of the optical elements extends as a single unitary piece from the first grating to the second grating.

20. The pair of optical elements of claim 17, wherein the pair is attached to an eye frame, hat or helmet.

* * * * *